United States Patent
Wicklund (10) Patent No.: US 6,741,565 B1
(45) Date of Patent: May 25, 2004

(54) SYSTEM AND METHOD FOR ESTIMATING CELL RATE IN AN ATM NETWORK

(75) Inventor: Rolf Göran Wicklund, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 659 days.

(21) Appl. No.: 09/611,337

(22) Filed: Jul. 6, 2000

(51) Int. Cl.⁷ .......................... H04L 12/26; H04L 12/56
(52) U.S. Cl. .................. 370/234; 370/236.1; 370/252; 370/395.51
(58) Field of Search .................. 370/229, 232–234, 370/236.1, 253, 395.1, 395.51, 395.52

(56) References Cited

U.S. PATENT DOCUMENTS

| | | | |
|---|---|---|---|
| 5,179,549 A | 1/1993 | Joos et al. | 320/234 |
| 5,563,885 A | 10/1996 | Witchey | 320/234 |
| 5,581,546 A | 12/1996 | Roosma et al. | 320/234 |
| 5,638,360 A | 6/1997 | Sugawara | 320/234 |
| 5,649,110 A | 7/1997 | Ben-Nun et al. | 320/234 |
| 5,701,291 A | 12/1997 | Roberts | 320/234 |
| 5,706,288 A | 1/1998 | Radhakrishnan et al. | 320/234 |
| 5,748,614 A | 5/1998 | Wallmeier | 320/234 |
| 5,751,697 A | 5/1998 | Radhakrishnan et al. | 320/234 |
| 5,754,530 A | 5/1998 | Awdeh et al. | 320/234 |
| 5,777,984 A | 7/1998 | Gun et al. | 320/234 |
| 5,790,605 A | 8/1998 | Helm et al. | 320/234 |
| 5,812,527 A | 9/1998 | Kline et al. | 320/234 |
| 5,848,056 A | 12/1998 | Meurisse et al. | 320/234 |
| 5,872,771 A | 2/1999 | Park et al. | 320/234 |

FOREIGN PATENT DOCUMENTS

| | | |
|---|---|---|
| CA | 2260084 | 7/1997 |
| WO | WO 98/03034 | 1/1998 |

OTHER PUBLICATIONS

"Discrete Time Stability Analysis of an Explicit Rate Algorithm for the ABR Service", Johansson et al., May 25–28, 1997, pp. 339–350.
"Congestion Control and Traffic Management in ATM Networks: Recent Advances and a Survey", Jain, vol. 28, No. 13, Oct. 1, 1996, pp. 1723–1738.

Primary Examiner—Hassan Kizou
Assistant Examiner—Gregory B Sefcheck
(74) Attorney, Agent, or Firm—Nixon & Vanderhye P.C.

(57) ABSTRACT

A method/system for estimating cell rate is provided. The cell rate to be reported to an ATM (asynchronous transfer mode) source may be estimated using a previously calculated cell rate parameter weighted in a manner dependent upon whether a rate for the connection is high or low. An averaging parameter may be adjusted for each calculation so that for low rate connections newly measured data is more heavily weighted, and for high rate connections newly measured data is less heavily weighted. Relatively accurate and quick estimates for both high bandwidth and low bandwidth connections are achievable.

14 Claims, 5 Drawing Sheets

RM (Resource Management) Cell Format [1]

| FIELD | | OCTET | BIT(s) | NAME |
|---|---|---|---|---|
| Header | | 1-5 | all | ATM Header |
| ID | | 6 | all | Protocol ID |
| Type | DIR | 7 | 8 | Direction |
| | BN | 7 | 7 | BECN Cell |
| | CI | 7 | 6 | Congestion Indication |
| | NI | 7 | 5 | No Increase |
| | RA | 7 | 4 | Request/Acknowledge |
| | | 7 | 3-1 | Reserved |
| ER | | 8-9 | all | Explicit Cell Rate |
| CCR | | 10-11 | all | Current Cell Rate |
| MCR | | 12-13 | all | Minimum Cell Rate |
| QL | | 14-17 | all | Queue Length |
| SN | | 18-21 | all | Sequence Number |
| Reserved | | 22-51 | all | Reserved |
| Reserved | | 52 | 16-11 | Refer to I.371 |
| CRC-10 | | 52-53 | 10-1 | Refer to I.371 |

SYSTEM AND METHOD FOR ESTIMATING CELL RATE IN AN ATM NETWORK

This invention relates to a system and/or method for estimating a cell rate in an ATM (asynchronous transfer mode) network. More particularly, this invention relates to a system and/or method for estimating cell rate by exponentially averaging the number of cell intervals between two cells received on a connection in an ATM network.

BACKGROUND

The increasing interest for high band services such as multimedia applications, video on demand, video telephone, cellular phone services, and teleconferencing has motivated development of the Broadband Integrated Service Digital Network (B-ISDN). B-ISDN is based on ATM, and offers considerable extension of telecommunications capabilities.

ATM is a packet-oriented transfer mode which uses asynchronous time division multiplexing techniques. ATM packets are called "cells" and have a fixed size. An ATM cell typically consists of fifty-three (53) octets, five (5) of which form a header and forty-eight (48) of which constitute a payload or information part of the cell. The header includes two quantities which are used to identify a connection in an ATM network over which the cell is to travel, particularly the VPI (virtual path identifier) and VCI (virtual channel identifier).

At its termination or end points, an ATM network is connected to terminal equipment such as ATM network users (i.e. end systems). Between ATM end systems are a plurality of switching nodes having ports which are connected together by physical transmission paths or links. Thus, an ATM network is a collection of end systems interconnected through one or more ATM switches. On a connection, an end system both sends data to other end system(s) on the network involved in the connection, and receives data from other end systems on the network involved in the connection. When an end system is a data sender, it is called a "source" and when a receiver it is called a "destination." For example, see U.S. Pat. Nos. 5,963,553 and 5,946,309, the disclosures of which are hereby incorporated herein by reference.

Multiple service categories of differing traffic characteristics and/or service guarantees have been defined for ATM networks. Examples include CBR (constant bit rate), rt-VBR (real-time variable bit rate), UBR (unspecified bit rate), nrt-VBR (non-real-time variable bit rate), and ABR (available bit rate).

Figure 1:
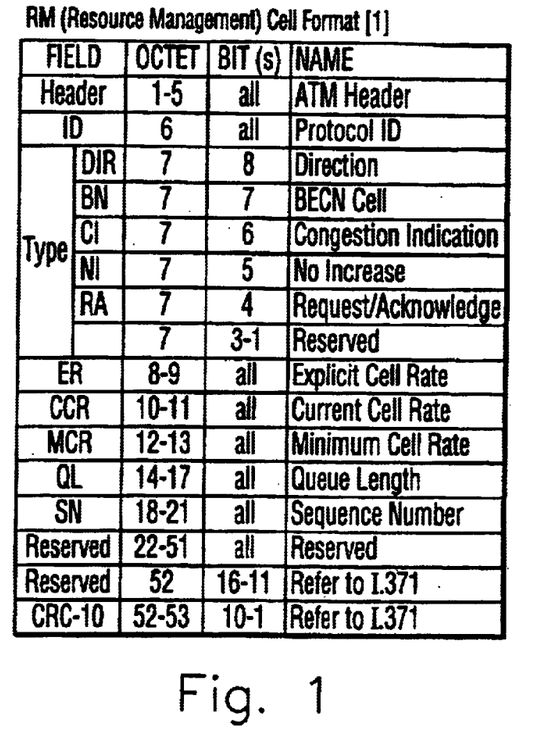
FIG. 1 shows various fields of an ATM RM cell.

ABR is intended primarily for non-real-time data applications with varying and/or unknown bandwidth requirements and which cannot easily be characterized in terms of a peak cell rate, a sustainable cell rate, and a maximum burst size. The source of an ABR VC (virtual circuit or connection) periodically creates and sends control cells called RM (resource management) cells which travel through the same path as data cells (e.g., traffic cells) of the VC to the destination of that VC. The destination then loops these cells back to the source through the same path. When an RM cell is traveling from the source to the destination it is called a forward RM cell; and when travelling from the destination to a source it is called a backward RM cell. FIG. 1 illustrates an exemplary RM cell including fields thereof.

Referring to FIG. 1, certain of these RM cell fields are read-only fields while others may be modified by intermediate ATM switches and/or the destination. For example, the CCR (current cell rate) field is a read-only field that contains the value of ACR (allowed cell rate) at the transmission time of the RM cell from the source. The DIR field represents a direction bit. When a source creates an RM cell, its sets DIR to zero (0) indicating a forward RM cell. Before the destination loops back an RM cell, it changes DIR to one (1) indicating a backward RM cell.

The ACR (contained in the CCR field) represents the rate the source is using to control its cell transmission for a VC or other network connection. The ACR value of a particular forward RM cell is inserted into that cell's CCR field at the time of its transmission. Sources adjust ACR based upon cell rate feedback carried by returning RM cells.

ABR switch mechanisms often suffer from CCR-reliance problems as follows. ER (explicit rate) values are determined by an ABR switch for each ABR connection. These values are sent back to the source in backward RM cells. ABR switch mechanisms typically read the CCR fields of RM cells passing through them and use these CCR fields in their ER calculations.

An implicit assumption that existing systems make is that the CCR field read by a switch from an RM cell on a given VC represents the actual rate of the VC at the moment of reading the field. This is often not true for at least the following reasons. First, CCR represents the maximum rate that the VC can use (i.e. ACR) at the time the RM cell was transmitted by the source. However, an ABR VC need not use all of its ACR. Thus, ACR may be larger than the actual rate of the VC. Second, when an RM cell is received by an intermediate switch and its CCR field read by the switch, the CCR field is old at that point and may not reflect the current value of ACR back at the source, not to mention the current actual cell rate. Third, a bad (or smart) source may insert a wrong ACR value into its CCR field in hope of acquiring more rate by doing so. This can cause the network to suffer in terms of buffer overflows; and fairness issues may arise.

To avoid the aforesaid CCR-reliance problems, per ABR VC rate measurements may be performed. One way of measuring (or estimating) ATM cell rate is to define a measuring time period "T" (e.g. 5 ms), and count the number of received ATM cells on a connection during that period. The cell rate is then n/T, where "n" is the count. This method may be rather accurate when the value of "n" is large (i.e. for high cell rate connections), because a minor deviation in the count number "n" does not substantially change the calculated rate. For example, if "n" changes from 75 to 73 when T is 5 ms, this only changes the measured cell rate from 15000 cells/s to 14600 cells/s, which is not a substantial change.

On the other hand, for low rate connections, the value "n" is small and even a single deviation in count value "n" can substantially affect the calculated cell rate. For example, assume the cell rate is just below one cell per period. In some intervals the count "n" will be one (1) and the rate 200 cells per second, but in other intervals the count "n" will be zero (0) and the calculated rate will be zero (0). Likewise, even a shift in "n" from 1 to 2 will substantially change the measured cell rate from interval to interval. In short, this method of estimating cell rate is undesirable for low cell rate applications/connections.

Another manner in which to measure or estimate ATM cell rate is to measure the time (using a count of ATM cell intervals) between two cells received on the same connection (e.g. VC). The estimated cell rate in this case is $1/(n*t)$, where "t" is the length of a cell interval and "n" is the count value. This method has the opposite problem as that of the first measurement method previously described. This method is rather accurate for low cell rate connections ("n" is large), but does not work well for high cell rate connections ("n" is low). In high cell rate connections where "n" is low, a change in "n" from one (1) to two (2) would have a substantial effect on the measured cell rate. For example, if a rate over five or so cells received on a connection was truly about $1/1.1*t$ (but "n" varied between 1 and 2), the calculation of cell rate when "n" was 2 would be $\frac{1}{2}*t$ and would not accurately reflect the true cell rate.

The point where the two aforesaid methods have approximately the same accuracy is when "n" is equal in both methods, which is when "n" is equal to the square root of N (where N is the number of cell intervals in the measuring period).

One solution to the aforesaid problem(s) would be to use the first method (i.e. cell rate=n/T) for connections with high cell rates and the second method (i.e. cell rate =$1/(n*t)$) for low cell rate connections. The problem with this approach is that an ATM connection (e.g. VC) may have very different cell rates at different times, so both types of measurements may have to be performed on all connections at all times.

What is needed therefore, and an object of this invention, is an efficient method/system for estimating ATM cell rates in both high and low cell rate connections.

SUMMARY OF THE INVENTION

A method/system for estimating cell rate is provided. The cell rate to be reported to an ATM (asynchronous transfer mode) source may be estimated using a previously calculated cell rate parameter weighted in a manner dependent upon whether the previous rate was high or low. An averaging parameter may be adjusted for each calculation so that for low rate connections newly measured data is more heavily weighted, and for high rate connections newly measured data is less heavily weighted. Relatively accurate and quick estimates for both high bandwidth and low bandwidth connections are thus achievable.

For example, in one non-limiting embodiment the cell rate (CR) on an ATM connection may be estimated as $CR=1/[A(new)*t]$, where: "t" is the length of a cell interval, and $A(new)=A(old)*(1-\alpha)+(\alpha*n)=A(old)-\alpha*(A(old)-n)$. In the latter equation, "n" is a value indicative of the number of cell intervals between two received cells on the same connection; A(old) is the previously stored and calculated cell rate parameter A; and "$\alpha$" is an averaging parameter to be adjusted between 0 and 1 as a function of cell rate on the connection. When "n" is large (low cell rate) on a connection, parameter "$\alpha$" is adjusted to a high value(s) so that previously estimated or calculated cell rate parameters (e.g. A, "n", and/or CR) are soon forgotten and the newly estimated cell rate is based primarily upon newly measured data. However, when "n" is small (high cell rate) and may thus vary substantially relative to its previous value, parameter "$\alpha$" is adjusted to a lower value so that newly measured data does not have a significant immediate effect on the estimated cell rate (CR) to be sent back to a source in a backward RM cell.

BRIEF DESCRIPTION OF THE DRAWINGS

The foregoing and other objects, features, and advantages of the invention will be apparent from the following more particular description of preferred embodiments as illustrated in the accompanying drawings in which like reference numerals indicate like parts throughout the several views. The drawings are not necessarily to scale, emphasis instead being placed upon illustrating principles of the invention.

DETAILED DESCRIPTION OF THE DRAWINGS

In the following description, for purposes of explanation and not limitation, specific details are set forth such as particular architecture, interfaces, circuitry, techniques, etc. in order to provide a thorough understanding of the present invention. However, it will be apparent to those skilled in the art that the present invention may be practiced in other embodiments that depart from these specific details. In other instances, detailed descriptions of well known devices, circuits, graphs, and methods are omitted so as not to obscure the description of the present invention with unnecessary detail.

Figure 2:
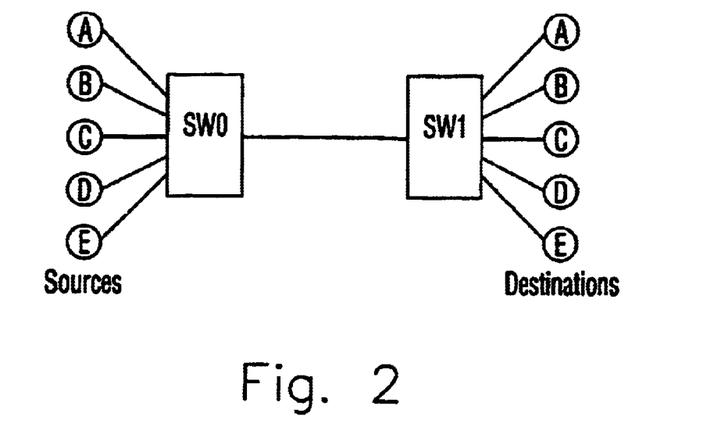
FIG. 2 is a schematic illustration of a portion of an ATM network including first and second ATM switches through which a plurality of sources and destinations communicate via ATM cells.

FIG. 2 is a schematic illustration of an ATM network including ATM sources A–E which communicate with ATM destinations A–E via ATM switches SW0 and SW1. On a given ABR VC, a source sends data cells to a destination through one or more switches SW, with the source periodically creating and sending forward RM cells (see FIG. 1). The aggregate traffic sent by the source is dynamically shaped to an ACR (allowed cell rate) which is controlled by the network. In particular, the source inserts its current ACR in the CCR field of forward RM cells. It also indicates its desired rate through the ER (explicit rate) field. The ER field is often set to the peak cell rate (PCR) of the connection. When a destination receives a forward RM cell, it changes the DIR bit to one (1), reduces the ER field to whatever value it can support, and loops the RM cell back to the source. The backward RM cells travel through the same path as that of the data and forward RM cells on the same VC, but in reverse direction.

In accordance with the ATM Forum Traffic Management Specification, intermediate switches SW have the option of intercepting forward and/or backward RM cells to reduce their ER fields to whatever values they can support so long as fairness is maintained. Thus, when an RM cell finally returns to its originating source, its ER field reflects the maximum possible rate on the most congested link along the connection's path. The source may then adjust its ACR using:

$$ACR_{new} = \min(ER \text{ in returning } RM \text{ cell}, ACR_{current} + RIF*PCR) \quad \text{Equation (1)}$$

where RIF (rate increase factor) is a parameter that is determined during connection set-up. It can be seen that when RIF=1, ACR is totally controlled by the ER values in returning RM cells. Thus, ER values received by a source via returning RM cells have an impact on how the source sets its future cell rate parameters.

Certain embodiments of this invention relate to an ATM entity (e.g. ATM switch or end system) calculating or estimating an ATM cell rate that is to be used in calculating an ER value in a backward RM cell (e.g., measured CCR values need not be directly reported back to the source; but instead may be used as inputs to an algorithm that calculates the ER value, i.e., ER=function of measured CCR). By more efficiently calculating this value, the aforesaid CCR-reliance problems are addressed and/or resolved. ATM sources may then utilize these returned ER values in setting their ACR/ER values in the context of the ABR service category.

While the below-listed description and illustrations herein are in the context of an ATM ABR service category, it will be recognized by those of skill in the art that this invention is not so limited, and may be used or implemented whenever a measurement or estimation of the cell rate for a connection is needed (not just for ABR ER calculations).

Figure 3:
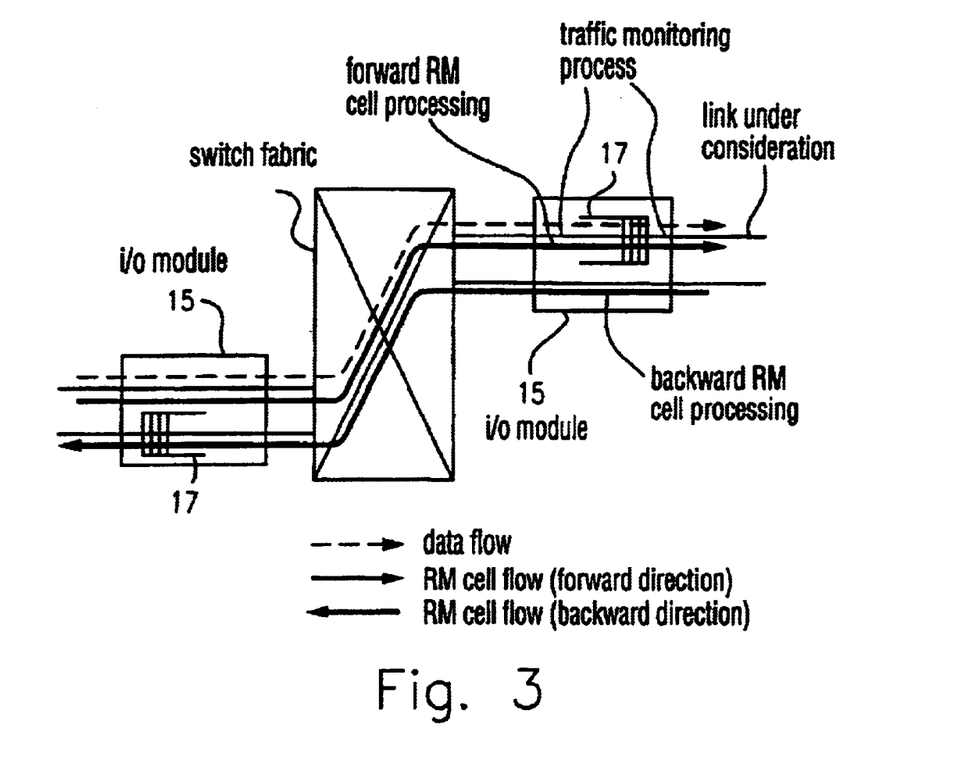
FIG. 3 is a schematic illustration of an ATM switching mechanism including a pair of ports for accommodating ATM cell flow.

As shown in FIG. 3, an ATM switch fabric connects a pair of ports 15, each having a queue 17 at its egress. The data cell and RM cell flows on an ABR VC are shown in differing solid lines with arrows. These lines may lead to any of the sources/destinations shown in FIG. 2. The method/system for calculating an ATM cell rate set forth herein may be carried out at an ATM switch, or alternatively at any destination in the network that receives ATM cells.

In certain embodiments of this invention, the rate calculation or estimation is based on an exponential averaging of the number "n" of cell intervals between two cells received on the connection (i.e. an improvement of the cell rate=1/(n*t) methodology described previously). A cell rate (CR) estimate is calculated to be:

$$CR=1/(A(\text{new})*t) \qquad (2)$$

where "t" is the length of a cell period and cell rate parameter A(new) is a function of "n" that is calculated as set forth below. A(new) in this particular embodiment is not an integer, but a real value having a fractional part.

Each time an ATM cell is received (either by a switch or end system which carries out this invention), it is timestamped. The difference between this timestamp and the previous timestamp of a cell from the same connection shows the number of cell intervals between two cells from that connection. The difference between the timestamps is thus "n".

When a new ATM cell is received on the connection at issue, new cell rate parameter A(new) is calculated in Equation (3) as follows:

$$A(\text{new})=A(\text{old})*(1-\alpha)+\alpha*n=A(\text{old})-\alpha*(A(\text{old})-n) \qquad (3)$$

In equation (3): "*" means multiply; A(old) is indicative of and proportional to the mean value of the number of cell intervals "n" between two consecutively received cells recently received on the same connection (or alternatively may be the previously calculated and stored value of cell rate parameter A); "n" is the difference between timestamp values (or any other number) that is indicative of the cell interval between the two cells received on the same connection; and "α" is an averaging parameter that is set (as will be described hereinbelow) as a function of the cell rate on the connection (e.g. α may be set as a function of A, CR, and/or "n" in different embodiments of this invention). As can be seen, A (old) is indicative of and proportional to a number of cell intervals "n" between two previously received cells on the same connection.

Averaging parameter cc, set as a function of the connection's cell rate at issue, is preferably adjusted to a value that is consistently greater than zero (0) and less than or equal to one (1). In other words, 0 <α<1. When "α" is set to a relatively small value, the newly measured value "n" (which indicates the number of cell intervals between the newly received ATM cell on the connection and the previously received ATM cell on that connection) will have little or small effect on A(new), i.e., the function has a long memory. However, when "α" is set to a relatively large value (e.g. from 0.75 to 1.0), the newly measured value "n" will have a larger effect on A(new), and the older values of "n" and A(old) are quickly forgotten. As can be seen from the equation for A(new) above, if "α" is set to equal one (1), then A(new) will be calculated as being the newly measured value "n" for the received ATM cell (i.e., no memory at all). Thus, when the system is confident that the newly measured value "n" for a received cell on a particular connection is an accurate reflection of the actual cell rate (e.g. when "n" is very large), then "α" may be set to equal one (1).

For purposes of example only as to how "n" may be calculated, consider the following example. The term "n" is indicative of the number of received cells between two received cells belonging to the same connection. Suppose cells are received in the following order belonging to the number connection (each received cell includes a VPI/VCI value identifying its connection): 1, 2, 3, 4, 3, 2, 5, 6, 4, 5, 1. In this case, "n" indicates that the number of cell intervals between the 1-cells is ten (10). Likewise, the number of cell intervals between the 2-cells is four (4).

For low cell rate connections, "n" is large and in and of itself is a good reflection of the cell rate. In such a case, averaging parameter "α" is set close to one (1), e.g. from about 0.5 to 1.0. Thus, the older A and "n" values will soon be forgotten and A(new) will be close or closer to the newly measured "n" value. However, for high cell rate connections, "n" may vary relative to itself in a significant manner between two intervals (e.g. "n" may be 1 for a given cell, and 2 for the next). Thus, in a high cell rate environment, "α" is set at a smaller level (e.g. from about 0.001 to 0.50) so that newly measured "n" value(s) do not have a significant immediate impact on A(new). In other words, for high cell rate connections, it is desirable to set "ax" to a value so that "n" averaging takes place over a larger number of measured "n" values so that the reported rate is a more accurate representation of the true cell rate.

Accordingly, averaging parameter "α" is adjusted herein as a function of cell rate. Values "n", A and CR are reflections of cell rate. Thus, in certain embodiments "α" may be adjusted as a function of "n" while in other embodiments it may be adjusted as a function of A and/or CR for the connection at issue. If A (or "n" if it is the basis for adjustment) is small, then "α" is set to a relatively low value. If A (or "n") is large, then "α" is set to a relatively high value. In other words, averaging parameter "α" is adjusted so as to be proportional to cell rate (e.g. "α" is proportional to at least one of "n", A, and CR).

In certain non-limiting embodiments, averaging parameter "α" may be adjusted so as to proportional to cell rate in accordance with the following equation:

$$\alpha=k* A(\text{old}) \qquad (4)$$

where "k" is some constant and A(old) is some previously measured value of A (preferably the immediately previous value of A). In certain embodiments, "α" is set in a manner so as to be greater than some minimum value "m" such as zero (0), but no greater than one (1.0).

For very high cell rate connections, "n" as measured for a newly received ATM cell may vary between 1 and 2 for example. The more "1"s, the higher the true cell rate. Assume that a resolution of 0.1% is desired for the highest possible cell rate. When the count "n" is 2, the value A(new) (truly just above 1) will increase from one (1) to $(1-\alpha)*A$(old)$+2*\alpha$(or roughly $1+\alpha$), which should not end up being higher than 1.001 in view of the desired 0.1% resolution requirement. A minimum value for averaging parameter "$\alpha$" (for the highest cell rate) given the desired 0.1% resolution for the highest cell rate can thus be calculated as $1/1000$. This can be adjusted for implementation purposes to $1/1024$. Using such methodology, a table of values for parameter "$\alpha$" can be developed in any suitable manner. An exemplary table in this regard is set forth below in Table 1, where "$\alpha$" is set so as to be proportional to A(old).

TABLE 1

A(old) vs. "$\alpha$"

| A(old) value | "$\alpha$" value |
|---|---|
| A < 2 | $1/1024$ |
| 2–4 | $1/512$ |
| 4–8 | $1/256$ |
| 8–16 | $1/128$ |
| 16–32 | $1/64$ |
| 32–64 | $1/32$ |
| 64–128 | $1/16$ |
| 128–256 | $1/8$ |
| 256–512 | $1/4$ |
| 512–1024 | $1/2$ |
| A > 1024 | 1 |

In Table 1, values indicative of parameter "$\alpha$" are a function of A for purposes of example only. A similar table may be used to set "$\alpha$" as a function of a new or old "n" count value, or any other type of table may be used so long as "$\alpha$" is adjusted as a function of cell rate or a cell rate parameter. As can be seen above in Table 1, the higher the cell rate, the smaller the value set for "$\alpha$." When a new ATM cell is received, after "$\alpha$" has been calculated or adjusted in accordance with cell rate (as exemplified above), the "$\alpha$" value is inserted into equation (1) so that A(new) can be calculated and thereafter plugged into the equation for determining estimated cell rate CR.

As shown in Table 1 above, when A is greater than 1024 (low cell rate) parameter "$\alpha$" is set to one (1). This is because when "n" is large, it is a good reflection of cell rate when placed into the equation $1/(n*t)$. Thus, when "n" or "A" exceeds a predetermined threshold then "$\alpha$" may be set to a predetermined value such as $3/4$, 1, or the like (this value need not be 1 in all embodiments of this invention).

Figure 4:
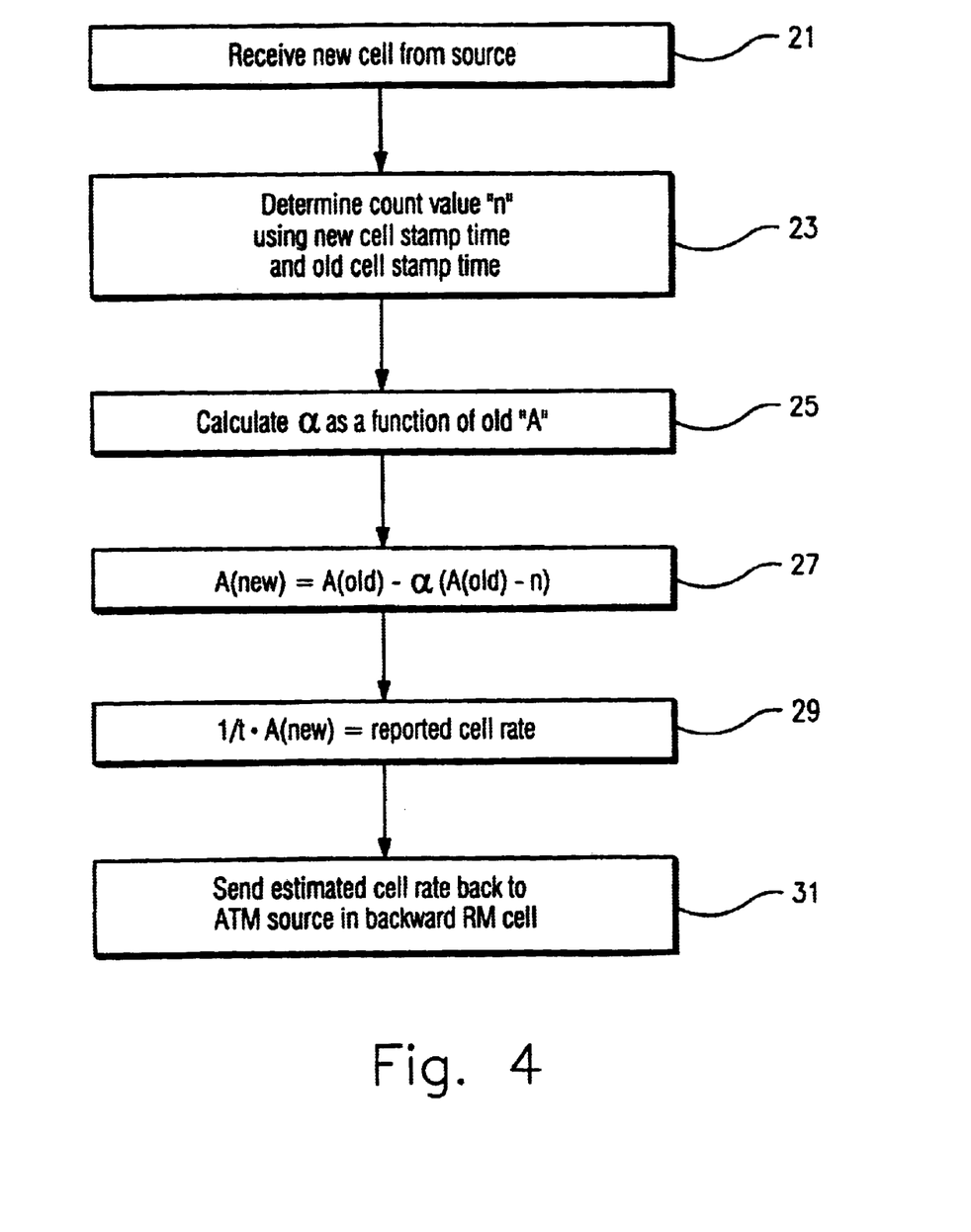
FIG. 4 is a flowchart generally illustrating a manner in which new cell rate (CR) is estimated upon receipt of an ATM cell according to an embodiment of this invention.

FIG. 4 briefly explains how cell rate estimate CR is calculated in one example embodiment of the invention. Initially, a previous cell rate parameter A(old) and previous timestamp for the last cell received on a given connection are stored in memory. A new cell on the connection is received (step 21). Using the earlier timestamp and a new timestamp applied to the newly received cell, count value "n" is determined as described above (step 23). Averaging parameter "$\alpha$" is adjusted or calculated as a function of cell rate (e.g. as a function of A(old)) (step 25). A new value A(new) is then calculated based in part upon effectively multiplying the newly determined "n" by averaging parameter "$\alpha$." For example, as shown in step 27, A(new) = A(old)$-\alpha$(A(old)$-n$). After A(new) has been calculated, the estimated cell rate is then calculated: CR=$1/(t*A(new))$ (step 29). Following its calculation, the estimated cell rate CR is used as input(s) to an algorithm that calculates the ER value, so that the source can efficiently adjust its ACR and/or ER values for future cells on the connection (step 31).

Cell rates in ABR ATM applications have been known to rapidly change. To cope with this potential, an extra check may be implemented to determine if a newly measured "n" count value is of the same order of magnitude as the previously measured A value (i.e. A(old)). If the new "n" value differs significantly (e.g. more than four (4) times A, or less than one-quarter of A), then parameter "$\alpha$" should be set to a predetermined value (e.g. a mid-range value such as $1/2$) so that A(new), and thus CR, quickly converge to a new steady state value(s).

Figure 5:
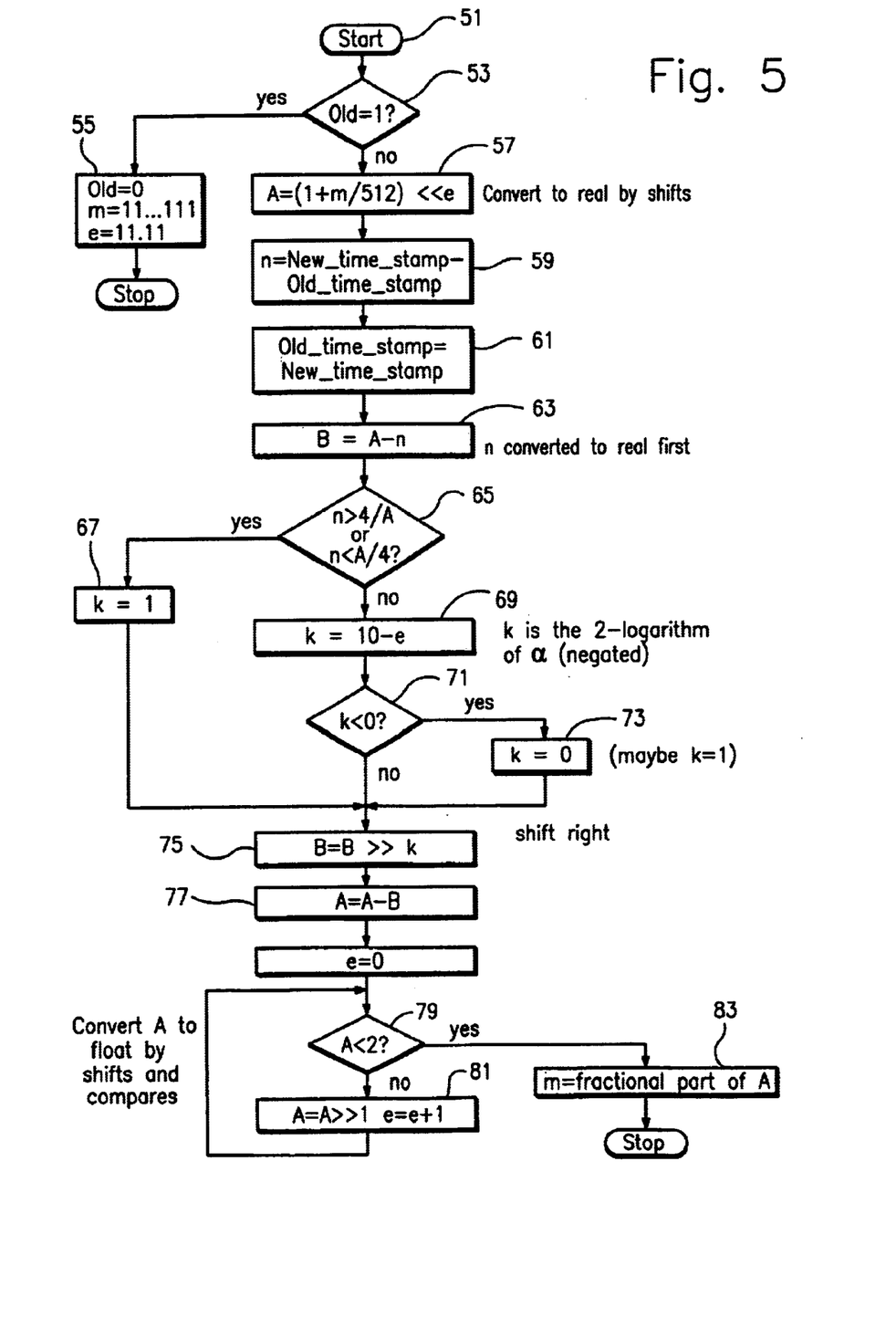
FIG. 5 is a flowchart illustrating how cell rate parameter A(new) is calculated in accordance with an embodiment of this invention.
Figure 6:
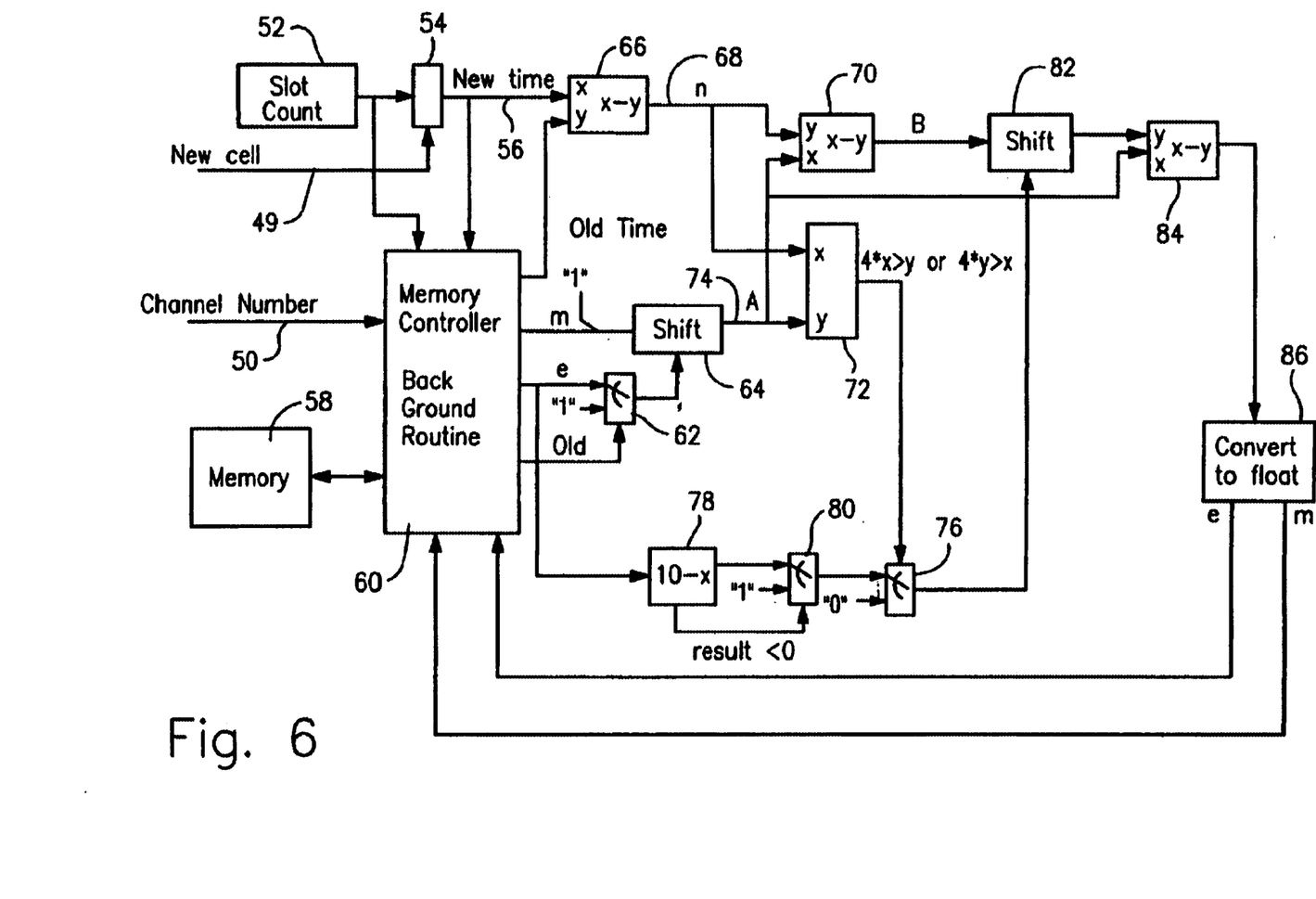
FIG. 6 is a block diagram illustrating circuitry used for calculating A(new) in accordance with an embodiment of this invention.

The above-listed equation (3) illustrates multiplication per se. From an implication perspective, it is not desirable to perform multiplication. However, effective multiplication by $2^k$ may be easily performed by logical shifts (i.e. shifts may be used to effectively multiply). Accordingly, in certain preferred embodiments of this invention, averaging parameter "$\alpha$" may be set to the nearest value of $2^{-k}$, k=1, 2, 3, 4 . . . . In such a manner, A(new) may then be calculated using subtractions and logical shifts as shown in FIGS. 5–6. Thus, in accordance with the embodiment described above, averaging parameter "$\alpha$" may be calculated as follows:

$$\alpha=(2**[2\log A])/1024; \quad (5)$$

$$\alpha=\min(\alpha, 1); \quad (6)$$

$$\alpha=\max(\alpha, 1/1024); \quad (7)$$

$$\text{if } n>4*A \text{ then } \alpha=1/2; \text{ and} \quad (8)$$

$$\text{if } n<A/4 \text{ then } \alpha=1/2. \quad (9)$$

In equation (5), "[2log A]" means the integer part of the 2-logarithm of A. In practice using the circuitry of FIG. 5–FIG. 6, this means the position of the most significant binary bit of A. Thus, in equation (5), "2**[2log A]" means in practice that all bits except the highest non-zero bit in A are cleared (note that A has a fractional part as well).

Given an assumption that 35 bits are available per connection for storage of values, the A value must have a good resolution and at the same time a wide range. Because 16 bits may not be enough to code it as an integer in all embodiments, it is preferably coded as a float (i.e. a float has a mantissa (m) and an exponent (e) as known in the art). For example, 9 bits may be used for the mantissa (m) and 5 bits for the exponent (e). The most significant bit of the mantissa (m) may be implicit, such that the value of A may be expressed as:

$$A=(1+m/512)*2^e \quad (10)$$

Equation (10) also is advantageous in that "$\alpha$" is directly found as $\alpha=2**e/1024$. It is noted that before A is used in the calculation, it must be coded as a real number (20 bits integer part and 10 bits fractional part), and when the A(new) result has been calculated, it is again coded into float as shown in FIG. 5–FIG. 6. Accordingly, there are 21 bits left over for the timestamp. However, one of these bits is preferably used to indicate "old" for a timestamp (see below), so 20 bits can thus be used for the actual timestamp for a received ATM cell. With 600 ns cell periods for example, this corresponds to 630 ms, or 610 bit/s. Timestamps may be maintained in number of cell intervals, i.e. if one cell interval is 600 ns, then a timestamp value of 10 corresponds to 6 microseconds.

It may happen that a source is silent for a period of time and thereafter begins again by sending a cell. In such a case, a cell received much earlier is preferably not be used due to its age. To handle this, all cells exceeding a predetermined age are identified by setting an "old" bit thereof for flagging purposes. For example, a background routine may check timestamps for all connections on a regular basis and marks those A(old) stamps that are too old (i.e. older than a predetermined value/age) with an old=1 stamp (i.e. set the old-bit in the same to "1"). In certain embodiments, an old timestamp (old=1) is applied to a cell who's stamp is more than 315 ms long (e.g. half the timestamp range). Whenever a cell is received, the old-bit is preferably reset. If the background routine is executed every $16^{th}$ cell cycle, for example, and there are 32k connections, one loop with take 315 ms, which is what is required in certain embodiments.

FIG. 5 and FIG. 6 illustrate one manner in which the invention may be implemented, although it will be understood that this embodiment is not limiting as the invention may also be implemented in many other ways as will be appreciated by those skilled in the art.

Referring to FIG. 6, an ATM cell 49 is received by the ATM switch or end system. Also received is a channel number 50 which identifies the channel on which the cell was received. These signals 49 and 50 may come from another hardware (HW) block that receives cells over a link and identifies the channels using the VPI/VCI values in the cells. New cell signal 49 clocks a running slot counter 52 into register 54. This is the new timestamp 56 for the channel on which the new cell was received. Channel number 50 is used to address memory 58 via controller 60, where data for each channel (e.g. Old_time_stamp, mantissa (m) for A(old), exponent (e) for A(old), and old-bit indicative of whether data in RAM is too old for use) is stored. Controller 60 retrieves the most recently calculated and stored A(old) value (in float format) for the connection (e.g. VC) corresponding to the newly receive cell from memory 58 via its "m" and "e" along with the timestamp for the last received cell on that connection (Old_time_stamp).

A background routine in controller 60 checks all old timestamp values of memory 58 versus a value from slot count 52 to make a determination as to whether they are too old to use. If so, the old bit of Old_time_stamp retrieved from memory 58 is set to 1 as discussed above (an indication that this stamp should not be used because it is too old). Upon receiving a cell on a given connection, controller 60 initially checks to see if the old bit for the last timestamp for that connection is set to 1 (step 53). If so, the old-bit is reset to zero (0) (step 55) and A(old) is set to a very high value, preferably greater than 1024 by selector 62 and shift register 64 (step 55). In step 55, when A(old) is set to such high value, this results in a parameter α value of 1.0 (e.g. see Table 1 above) which in effect means that the A(old) value is not used in calculating A(new), i.e. CR is calculated solely based upon the newly measured count value "n" when placed in the equation 1/(n*t).

When it is determined in step 53 by controller 60 that the old bit is not set to 1, then A(old) is converted to a real number via shifting by register 64 and/or selector 62 (step 57). Controller then forwards the old timestamp value to comparator 66 which also receives from register 54 the new timestamp of the newly received cell. Comparator 66 determines the newly measured "n" count value in step 59 by subtracting the old timestamp from the new timestamp, and outputs the measured "n" value 68 to comparators 70 and 72. After "n" has been calculated by comparator 66, controller 60 resets the "old timestamp" value to the "new timestamp" value which the controller received from register 54 (step 61). The new value for the "old timestamp" is then stored in memory 58.

Shift register 64 receives the mantissa and exponent bits of A(old) and converts the same to real, which is forwarded at 74 to comparators 70 and 72. Processor/comparator 72 receives "n" and real A(old), converts "n" to real in step 63, and then makes a determination as to whether "n" is greater than 4/A or less than A/4 in step 65 (to detect whether a rapid change in rate has occurred). If so (rapid rate change detected), then processor/comparator 72 causes k to be set to one (k=1) by selector 76 (step 67). As discussed above, this results in "α" being set to approximately ½ so that A(new) quickly converges to a new steady state estimate value. On the other hand, if it is determined that the step 65 query is negative, then k is set to the 2-logarithm of α (negated) in step 69 (k=10-e) by arithmetic function 78. If k is then determined by function 78 at step 71 to be less than zero (0), then k is set to zero (0) at step 73 by function 78 and selector(s) 76, 80.

Thus, the output of selector 76 determines the k value sent to shift register 82. Register 82 also receives B from comparator 70, and performs step 75 by shifting B to the right by k bits. Thereafter, comparator 84 performs step 77 [A(new)=A(old)−B (shifted)] to calculate A(new). Looking at step 75 followed by step 77, B has been set to A-n and k has been set to 10-e. Thus, A is from a practical standpoint set to: A=A−(A−n) >>(10−k) which is the same as A(new)= (A(old)−(A$^k$−n)*2)/1024, which is the same as the equation (3) listed previously.

After A(new) is calculated at 84, it is converted to float format at 86 in steps 79, 81 and 83 in a well known manner, and stored in memory 58 as A(old) replacing the previous value for the same.

After A(new) has been calculated, the estimated cell rate is then calculated: CR=1/(t*A(new)). Following its calculation, the estimated cell rate CR is used to calculate ER (e.g., via a backward RM cell) so that the source can efficiently adjust its ACR and/or ER values for future cells on the connection. Advantages include quick cell rate estimates for both high and low bandwidth conditions.

FIG. 6 is for purposes of example only and is not intended to be limiting. In other words, other types of circuits and/or software may be used to carry out the steps listed in FIG. 4 and FIG. 5.

Certain embodiments of this invention relate to an ATM entity (e.g. ATM switch or end system) calculating or estimating an ATM cell rate that is to be sent back to a source as an ER value in a backward RM cell. An averaging parameter may be adjusted for each calculation so that for low rate connections newly measured data is more heavily weighted, and for high rate connections newly measured data is less heavily weighted. Thus, estimates may be more efficiently calculated and relatively accurate and quick estimates for both high bandwidth and low bandwidth connections are achievable. By more efficiently calculating this value, the aforesaid CCR-reliance problems are addressed and/or resolved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of calculating an estimated cell for a connection, the method comprising:
   receiving a cell on the connection;
   adjusting an averaging parameter so that a value of the averaging parameter is a function of cell rate;
   estimating a cell rate for the connection using the value of the adjusted averaging parameter;

wherein said adjusting includes adjusting the averaging parameter so that the value of the adjusted averaging parameter is proportional to at least one of (a) a number of cell intervals between the received cell and a previously received cell, and (b) a previously stored value indicative of or calculated at least in part based upon a number of cell intervals between two received cells; and calculating a cell rate parameter A(new) in the following manner:

$$A(new)=A(old)*(1-\alpha)+\alpha*n=A(old)-\alpha*(A(old)-n)$$

wherein $\alpha$ is the averaging parameter that is adjusted in said adjusting step, "n" is a count value indicative of a number of cell intervals between the received cell and a previously received cell on the same connection, and A(old) is a previously calculated and stored value indicative of a number of cell intervals between two previously received cells;

estimating the cell rate (CR) by CR=1/(A(new)*t), where "t" is a length of a cell period; and sending the estimated cell rate CR to a source via a backward RM cell.

2. The method of claim 1, further comprising the step of determining a count value indicative of a number of cell intervals between the received cell and a previously received cell on the same connection.

3. The method of claim 2, wherein said estimating step further includes estimating the cell rate for the connection using the count value indicative of the number of cell intervals between the received cell arid the previously received cell on the same connection.

4. The method of claim 1, further comprising the step of determining a count value indicative of a number of cell intervals between the received cell and a previously received cell on the same connection, and wherein said determining a count value step includes comparing timestamp values for the received cell and the previously received cell.

5. The method of claim 1, wherein the received cell is an ATM cell, and the method further comprising the step of sending the estimated cell rate back to a source on an ATM network via a backward RM cell.

6. The method of claim 1, wherein said estimating step comprises adjusting the averaging parameter in a manner such that in a high cell rate connection a previously estimated cell rate parameter for the connection contributes more to the cell rate estimated in said estimating step than in a low cell rate connection.

7. The method of claim 1, wherein said adjusting step includes adjusting the averaging parameter so that the parameter is larger for low cell rate connections than for high cell rate connections.

8. A method of calculating an estimated cell rate for a connection, the method comprising:

receiving a cell on the collection;

adjusting an averaging parameter so that a value of the averaging parameter is a function of cell rate;

estimating a cell rate for the connection using the value of the adjusted averaging parameter; and determining whether a count value "in" relating to the received cell differs from a stored value by more than a predetermined amount; and when the count value "n" differs from the stored value by more than the predetermined amount, then setting the averaging parameter to a predetermined value.

9. In an ATM network including one or more ATM switches, a method of estimating ATM cell rate on a given connection of the network comprising:

receiving an ATM cell on the connection;

adjusting an averaging parameter so that an adjusted value of the parameter is at least partially a function of a value indicative of cell rate on the connection;

estimating a cell rate for the connection using the adjusted value of the averaging parameter;

wherein said adjusting includes adjusting the averaging parameter so that the adjusted value of the parameter is at least partially a function of a previously stored value reflecting a number of cell intervals between two ATM cells received from a source on the connection; and determining whether a count value "n" relating to the received cell differs from a stored value by more than a predetermined amount; and when the count value "n" differs from the stored value by more than the predetermined amount, then setting the averaging parameter to a predetermined value.

10. An apparatus for estimating ATM cell rate for a connection, the apparatus comprising:

a receiver for receiving a cell oil the connection;

a circuit for adjusting an averaging parameter to a value relating to cell rate of the connection;

an estimating circuit for estimating a cell rate for the connection using the value of the averaging parameter;

means for adjusting the averaging parameter so that the value of the averaging parameter is proportional to at least one of (a) a number of cell intervals between the received cell and a previously received cell, and (b) a previously stored value indicative of or proportional to a number of cell intervals between two received cells; and means for determining whether a count value "n" relating to the received cell differs from a stored, value by more than a predetermined amount; and when the count value "n" differs from the stored value by more than the predetermined amount, then setting the averaging parameter to a predetermined value.

11. The apparatus of claim 10, further comprising means for determining a count value indicative of a number of cell intervals between the received cell and a previously received cell on the same connection.

12. An apparatus for estimating ATM cell rate for a connection, the apparatus comprising:

a receiver for receiving a cell on the connection;

a circuit for adjusting an averaging parameter to a value relating to cell rate of the connection;

an estimating circuit for estimating a cell rate for the connection using the value of the averaging parameter;

means for calculating a cell rate parameter A(new) by:

$$A(new)=A(old)*(1-\alpha)+\alpha*n=A(old)-\alpha*(A(old)-n)$$

wherein $\alpha$ is the averaging parameter, "n" is a count value indicative of a number of cell intervals between the received cell and a previously received cell on the same connection, and A(old) is a previously calculated and stored value indicative of and proportional to a number of cell intervals between two previously received cells;

means for estimating cell rate CR by CR=1/(A(new)*t), where "t" is a length of a cell period; and means for sending the estimated cell rate CR to a source via a backward RM cell.

13. In an ATM network including one or more ATM switches, an apparatus for estimating cell rate on a given connection of the network comprising:

means for receiving an ATM cell on the connection;

means for adjusting an averaging parameter so that an adjusted value of the averaging parameter is larger for low cell rate connections than for high cell rate connections;

means for estimating a cell rate for the connection using the adjusted value of the averaging parameter;

wherein said means for adjusting is further for adjusting the averaging parameter so that the value of the adjusted averaging parameter is proportional to at least one of (a) a number of cell intervals between the received cell and a previously received cell, and (b) a previously stored value indicative of or calculated at least in part based upon a number of cell intervals between two received cells; and means for determining whether a count value "n" relating to the received cell differs from a stored value by more than a predetermined amount; and when the count value "n" differs from the stored value by more than the predetermined amount, then setting the averaging parameter to a predetermined value.

14. A method of calculating an estimated cell rate for a connection comprising:

receiving an ATM call on the connection;

adjusting an averaging parameter so that an adjusted value of the averaging parameter is larger for a low cell rate connection than for a high cell rate connection;

estimating a cell rate for the connection using the value of the adjusted averaging parameter;

wherein said adjusting includes adjusting the averaging parameter so that the value of the adjusted averaging parameter is proportional to at least one of (a) a number of cell intervals between the received cell and a previously received cell, and (b) a previously stored value indicative of or calculated at least in part based upon a number of cell intervals between two received cells; and determining whether a count value "n" relating to the received cell differs from a stored value by more than a predetermined amount, and when the count value "n" differs from the stored value by more than the predetermined amount, then setting the averaging parameter to a predetermined value.

* * * * *